(12) United States Patent
Frankenstein

(10) Patent No.: US 7,008,194 B2
(45) Date of Patent: Mar. 7, 2006

(54) TURBOCHARGER

(75) Inventor: Dirk Frankenstein, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/653,436

(22) Filed: Sep. 2, 2003

(65) Prior Publication Data

US 2005/0188694 A1    Sep. 1, 2005

(30) Foreign Application Priority Data

Sep. 2, 2002  (EP) .................................. 02019179

(51) Int. Cl.
F04B 17/00    (2006.01)
F01D 25/18    (2006.01)

(52) U.S. Cl. ...................... 417/407; 415/230; 415/229; 415/175

(58) Field of Classification Search ................ 417/407; 60/602; 415/230, 229, 175, 168.2
See application file for complete search history.

(56) References Cited

U.S. PATENT DOCUMENTS

| | | | | |
|---|---|---|---|---|
| 1,474,454 A | * | 11/1923 | Telfer | 415/168.2 |
| 3,101,671 A | * | 8/1963 | Schroeder | 415/168.2 |
| 3,176,620 A | * | 4/1965 | Shiley | 415/168.2 |
| 4,196,910 A | * | 4/1980 | Aizu | 417/407 |
| 4,343,591 A | * | 8/1982 | Hannan et al. | 415/175 |
| 5,076,765 A | * | 12/1991 | Yagi et al. | 417/407 |

FOREIGN PATENT DOCUMENTS

| | | | | |
|---|---|---|---|---|
| DE | 2405741 A1 | * | 8/1975 | |
| DE | 3621600 A1 | * | 1/1988 | |
| DE | 3838902 A1 | * | 5/1990 | |
| JP | 59070830 A | * | 4/1984 | 417/407 |

* cited by examiner

Primary Examiner—Thai-Ba Trieu
(74) Attorney, Agent, or Firm—Pendorf & Cutliff; Greg Dziegielewski

(57) ABSTRACT

Turbocharger comprising a rotor shaft (5), a turbine housing (2), a compressor housing (3) connected to the turbine housing (2), and including at least one air supply channel (13') for supplying air to be compressed and at least one discharge channel (11) for delivering compressed air. One end of the rotor shaft projects into the compressor housing and supports a compressor rotor (21). A bearing (12) in the region of the compressor rotor supports the rotor shaft, and forms a bearing gap. The bearing includes two seals (29,30) axially spaced from one another to seal the bearing gap and to leave an intermediate space (31) between them. A suction channel (33,34) is connected to a vacuum source and sucks gas out of this intermediate space.

9 Claims, 2 Drawing Sheets

TURBOCHARGER

FIELD OF THE INVENTION

The present invention relates to a turbocharger comprising a rotor shaft that defines an axis of rotation. One end of the rotor shaft projects into a turbine housing having at least one supply channel for en exhaust gas, wherein at least one turbine rotor is fastened to the rotor shaft and is, thus, rotatably supported. The exhaust gas from the supply channel is fed to the periphery of the turbine rotor. Moreover, there is a compressor housing which comprises at least one air supply channel. Into this compressor housing projects the other end of the rotor shaft. To this end of the rotor shaft, at least one compressor rotor is secured from whose periphery compressed air is discharged into an air discharge channel. A bearing arrangement is provided at least in the region of the compressor rotor, and this bearing arrangement comprises a sealing arrangement.

BACKGROUND OF THE INVENTION

In turbochargers of this kind, a phenomenon is occurring during operation that is called "blow-by". This means that with an elevated exhaust gas pressure, i.e. with elevated numbers of revolution, the tendency can be observed that the exhaust gas flows from the turbine housing through unavoidable leakages into the region of the bearings, often accommodated in a separate bearing housing intermediate between the turbine housing and the compressor housing. Likewise, with elevated numbers of revolution and elevated charging pressure, air sucked into the compressor housing has the tendency to flow over a sealing, e.g. a piston ring, at the side of the compressor to the region of the bearings or the intermediate bearing housing.

Furthermore, with low charging pressure and a high number of revolutions, there exists the possibility that an oily mixture of air and exhaust gas from the region of the bearings flows in the direction of the compressor housing so that the emissive behavior is worsened.

SUMMARY OF THE INVENTION

It is an object of the present invention to reduce or to prevent the above-mentioned "blow-by" and, for example, the access of compressed air from the side of the compressor.

The invention is based on the recognition that the access of "blow-by" gases occurs, above all, from the side of the compressor, although the bearings, generally, have conventionally a sealing arrangement already, e.g. by means of a piston ring.

According to the invention, the above object is achieved in that the sealing arrangement comprises, in addition to a first seal, a spaced second seal, and that a suction channel is connected to the space between the first and second seal.

In this way, gases are sucked off, on the one hand, while better protection against the "blow-by" effect is achieved the second seal.

In accordance with the application, a vacuum source for providing vacuum to the suction channel will be formed by the suction side of the compressor rotor itself and/or by an exhaust gas duct from a combustion motor which supplies the exhaust gases (e.g. in the form of an injector pump). Alternatively or additionally an oil separator may be used which either may form the vacuum source itself or is connected to a vacuum source.

BRIEF DESCRIPTION OF THE DRAWINGS

Further details of the invention will become apparent from the following description of a preferred embodiment schematically illustrated in the drawings, in which.

DETAILED DESCRIPTION

Figure 1:
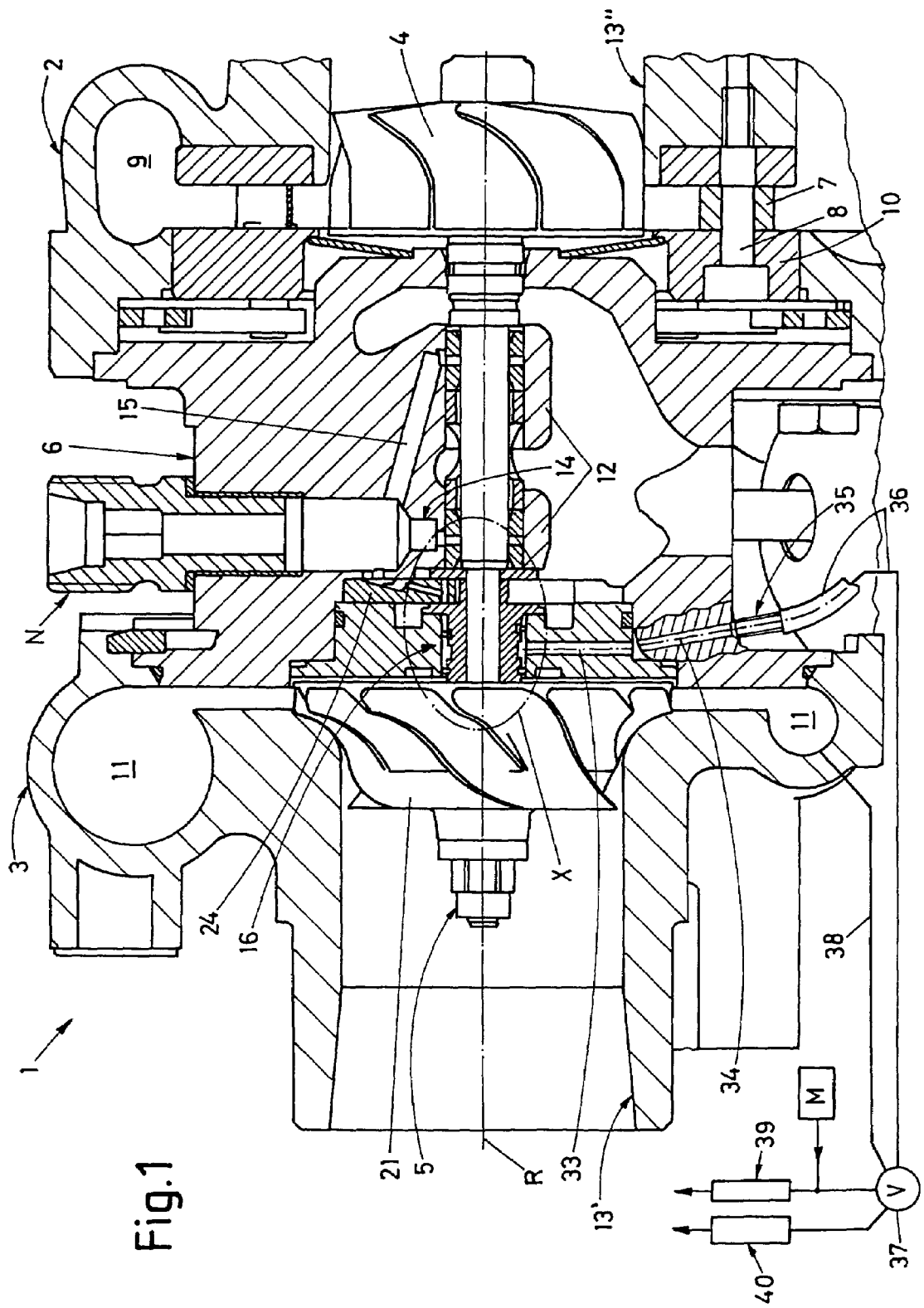
FIG. 1 is an axial cross-section of the essential parts of a turbocharger.

According to FIG. 1, a turbocharger 1 (only the center portion is represented, while portions at the left side and the right side are torn off) has in conventional manner a turbine housing part 2 and a compressor housing part 3 connected to the turbine housing 2, both being arranged along an axis of rotation R. The turbine housing part 2 is in cross-section and shows a turbine rotor 4 situated on and rotatable about the axis of rotation R. The turbine rotor 4 is fastened to one end of a rotor shaft 5 supported in a housing center part 6.

It should be noted that the term "end" of the rotor shaft should mean that portion of the shaft which projects into the respective turbine housing (one end) or compressor housing (other end). However, it is also known to prolong the shaft, for example, into a second turbine housing opposite the first turbine housing which embodiment should also be in the scope of the present invention. Moreover, the above-mentioned center part 6 may constitute a separate bearing housing intermediate between the turbine housing and the compressor housing.

The turbine housing 2 comprises at least one about annularly extending supply channel 9 for supplying exhaust gas so as to supply exhaust gas from a combustion motor to the turbine rotor 4. Supply to the turbine rotor is effected in the embodiment shown through vanes 7 of a so-called guiding grid of variable geometry (not described in detail here, because known to those of ordinary skill in the art), the vanes being adjustable with respect to their position (rather radial to the turbine rotor 4 or rather tangential) by means of adjusting shafts 8 supported by a shaft supporting ring or nozzle ring 10 to pivot the vanes 7. It will be understood that alternatively more than one supply channel may be provided, particularly if more than one turbine rotor is fastened to the shaft 5.

In this way, a compressor rotor 21, mounted on the other end of the rotor shaft 4, is driven by the turbine rotor 4. This compressor rotor 21 sucks air through an axial air supply channel 13', compresses it and blows it out through a discharge channel 11 (that may be formed similar as the exhaust gas supply channel 9 and may surround the compressor rotor 21). In a similar configuration, the turbine housing 2 has also an axial channel 13", which serves as an exhaust gas discharging channel.

The rotor shaft is supported by a bearing arrangement 12 to which a nipple N supplies a pressure burden for lubricating through bores 14 and 15. Although this pressure burden acts partially against the pressure of the air compressed by the compressor rotor, there is the tendency of the air at high numbers of revolution and high charging pressure to flow to the center part 6 of the housing.

In order to prevent this, the inventive embodiment having a sealing arrangement 16 is provided, as may be seen in FIGS. 1 and 2 and described in the following.

Figure 2:
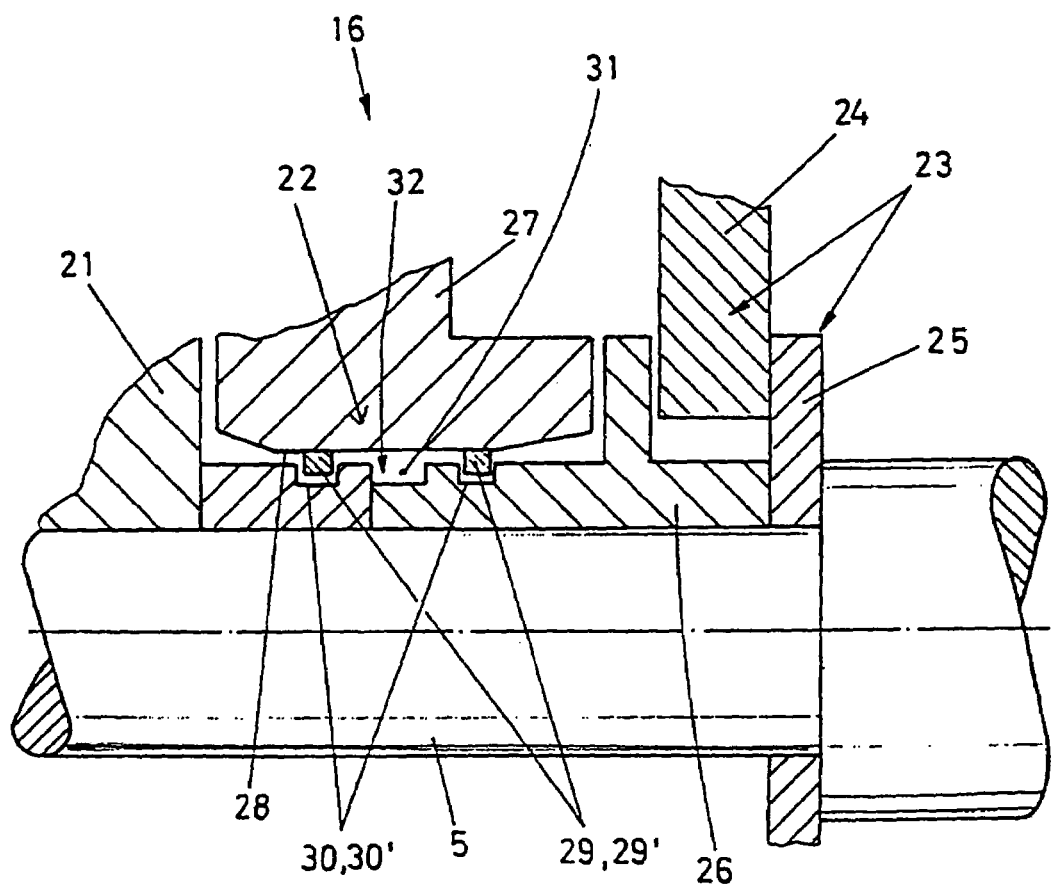
FIG. 2 shows a detail X of FIG. 1 at a larger scale.

According to FIG. 2, the sealing arrangement 16 (see FIG. 1) is formed by a housing wall and an axial bearing 23. For supporting in axial direction, a stationary bearing part 24 (see also FIG. 1) engages one of two rotor members 25, 26 connected to the rotor shaft 5. It is not critical whether these parts 25, 26 are separate parts or co-rotating components of an, e.g. correspondingly formed, such as by machining on a lathe or by milling, rotor shaft member 5. This applies also for grooves 30, 30' discussed later. However, it is preferred to have a smooth shaft member 5 and co-rotating rotating members 25, 20', which are correspondingly machined or milled.

On an inner wall 28 of a bearing housing portion 27 or a sealing zone 22, (at least) two piston rings 29, 29' are axially spaced from one another and mounted rigidly on this wall 28. These piston rings 29, 29' engage each a groove 30 or 30' of one of the rotating members fastened to the shaft 5 (or engage a groove machined into the shaft member 5 itself), thus forming a kind of labyrinth seal. It will be understood, that within the scope of the present invention other types of seals can also be used, such as lip seals (not so preferred due to the high number of revolutions of shaft 5 and the corresponding wear of such contacting seal). However in each case, it is important that the (at least) two seals are spaced from one another, as will be explained below.

For between these two sealing arrangements 29, 30 remains a space 31 which is, preferably enlarged, particularly by a groove 32 that is machined into one of the co-rotating members on the shaft 5 or into the shaft 5 itself. This enlargement could, in principle, extend over part of the circumference of the shaft 5 or the co-rotating member fastened to it, but is preferably formed as an annular groove. In this way, a suction channel (FIG. 1) in form of a vertical bore 33 and a joining inclined bore 34, as shown, is able to suck off any gas possibly being in this space 31 (FIG. 2) together with all impurities, such as lubricating oil, that may be contained in that gas. This gas is discharged through the inclined bore 34 to a hose nipple 35, where a hose 36 leads to a source of vacuum.

This source of vacuum may be of various kinds. In FIG. 1 several possibilities may be chosen by turning a three-way-valve 37, but it may, for some applications, be sufficient, either to use only one of the vacuum sources shown (in which case the valve 37 may be omitted) or only two of them (or any other type of known vacuum sources). Switching over may be effected either manually or automatically, for example as a function of the number of revolutions of the rotor shaft 5 or of the exhaust gas or compressed air pressure or of the mode of operation of a combustion motor M merely schematically indicated in FIG. 1.

In this way, the suction side of the compressor rotor 21 may be selected by three-way-valve 37 and conduit 38; or, alternatively, the exhaust gas conduit 39 of the combustion motor M, where the exhaust gases of motor M are used, for example, in an injector pump, as far as they do not flow through the turbocharger or only after they have been discharged from it through the axial pipe 13", in order to produce a negative pressure in the hose 36; or, as a further alternative, one may select an oil separator 40. Which one of the vacuum sources is used depends on the application and on other factors, as mentioned above. It would even be conceivable to use a valve 37, which is able to combine two of the vacuum sources shown to a lower or higher degree (similar to a combination set in a bath room). For example, the oil separator 40 may be used in operation conditions where a higher proportion of lubricating oil is to be expected in the gas that may flow to the compressor rotor 21, whereas with operation conditions of low pollution in the gas, the conduit 38 may be chosen.

Numerous modifications are possible within the scope of the present invention. For example, the enlargement 32 must not necessarily be formed in the shaft 5 or its co-rotating members, but could also (alternatively or in addition) be provided in the inner wall 28 of the sealing zone 22, although this is less preferred.

What is claimed is:

1. A turbocharger comprising:
   a rotor shaft (5) defining an axis of rotation (R),
   a turbine housing (2) including at least one gas supply channel (9) for supplying exhaust gas, wherein a first end of said rotor shaft (5) projects into said turbine housing (2);
   at least one turbine rotor (4) axially mounted on said rotor shaft (5) to receive exhaust gas at the periphery of said rotor;
   a compressor housing (3) comprising at least one air supply channel (13') for supplying air to be compressed, and wherein a second end of said rotor shaft (5) projects into said compressor housing (3);
   at least one compressor rotor (21) mounted on said rotor shaft (5) to deliver air to the periphery of said compressor rotor (21); and
   a seal arrangement (16) for the rotor shaft in the area of the compressor rotor (21), comprising a bearing means (24,25,26) and sealing means (29, 30, 29', 30');
   wherein sealing means (29, 30, 29', 30') further comprises in addition to a first seal means (29, 30) a second seal means (29', 30') axially spaced therefrom, and wherein a vacuum bore (33, 34) is provided in communication with a space (31) between the two sealing means (29, 30, 29', 30') and a vacuum source (11, 39, 40),
   wherein said vacuum source is formed by the vacuum source suction side (11) of the compressor (21) itself.

2. The turbocharger of claim 1, wherein said sealing means include piston rings (29, 29') rigidly mounted on a stationary inner wall of a stationary bearing housing, wherein said rotor shaft (5) or a rotor (26) mounted on said rotor shaft has circumscribing grooves (30, 30') defined therein, and wherein said piston rings (29, 29') extend into said grooves to form said sealing means (29, 30, 29', 30').

3. The turbocharger of claim 1, wherein said space (31) includes a widening (32).

4. The turbocharger of claim 3, wherein said widening (32) forms a ring shaped annular chamber extending around said axis of rotation (R).

5. The turbocharger of claim 3, wherein said widening (32) is formed as a groove circumscribing the rotor shaft (5).

6. The turbocharger of claim 2, wherein at least one of said first and second sealing means (29, 30, 29', 30') comprises a piston ring (29, 29') mounted in an oppositely lying ring groove (30, 30').

7. The turbocharger of claim 6, wherein said piston ring (29, 29') is provided on an inner wall (28) of said bearing means (24, 25, 26) adapted to engage an annular groove (30, 30') in a part rotating with the rotor shaft (5).

8. The turbocharger of claim 1, wherein said vacuum source is formed by an exhaust gas conduit (39) of an internal combustion engine (M).

9. The turbocharger of claim 1, wherein said vacuum source comprises an oil separator (40) located down-stream of said vertical bore (33) and inclined bore (34).

* * * * *